United States Patent
Yamasaki

(10) Patent No.: US 10,897,621 B2
(45) Date of Patent: Jan. 19, 2021

(54) MOVING IMAGE ENCODING APPARATUS, CONTROL METHOD FOR MOVING IMAGE ENCODING APPARATUS, AND STORAGE MEDIUM

(71) Applicant: CANON KABUSHIKI KAISHA, Tokyo (JP)

(72) Inventor: Shogo Yamasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/285,450

(22) Filed: Feb. 26, 2019

(65) Prior Publication Data

US 2019/0268605 A1 Aug. 29, 2019

(30) Foreign Application Priority Data

Feb. 27, 2018 (JP) ................. 2018-033677

(51) Int. Cl.
*H04N 19/167* (2014.01)
*H04N 19/176* (2014.01)
*H04N 19/124* (2014.01)
*H04N 19/513* (2014.01)

(52) U.S. Cl.
CPC ......... *H04N 19/167* (2014.11); *H04N 19/124* (2014.11); *H04N 19/176* (2014.11); *H04N 19/513* (2014.11)

(58) Field of Classification Search
CPC .................................. H04N 19/167
See application file for complete search history.

(56) References Cited

U.S. PATENT DOCUMENTS

| | | | | |
|---|---|---|---|---|
| 9,262,670 | B2* | 2/2016 | Pietila | H04N 19/137 |
| 2005/0286741 | A1* | 12/2005 | Watanabe | H04N 19/63 |
| | | | | 382/107 |
| 2006/0256867 | A1* | 11/2006 | Turaga | H04N 19/39 |
| | | | | 375/240.16 |
| 2007/0076947 | A1* | 4/2007 | Wang | H04N 1/628 |
| | | | | 382/165 |
| 2007/0086669 | A1* | 4/2007 | Berger | G06K 9/2081 |
| | | | | 382/243 |
| 2007/0189623 | A1* | 8/2007 | Ryu | H04N 19/17 |
| | | | | 382/243 |

FOREIGN PATENT DOCUMENTS

| | | | |
|---|---|---|---|
| JP | 2004187023 A | * | 7/2004 |
| JP | 2004187023 A | | 7/2004 |
| JP | 2008072608 A | * | 3/2008 |
| JP | 2008072608 A | | 3/2008 |

* cited by examiner

*Primary Examiner* — Dave Czekaj
*Assistant Examiner* — Shanika M Brumfield
(74) *Attorney, Agent, or Firm* — Carter, DeLuca & Farrell LLP

(57) ABSTRACT

A moving image encoding apparatus comprises a detection unit configured to detect motion information in units of blocks from a moving image; a determination unit configured to determine a region of interest in the moving image based on a first region determined through processing for detecting an object from an image, and the motion information; a control unit configured to perform control such that a quantized value of a block determined as being the region of interest is set to a value lower than a quantized value of a block determined as not being the region of interest; and an encoding unit configured to perform compression encoding on the moving image based on the quantized value set by the control unit.

11 Claims, 7 Drawing Sheets

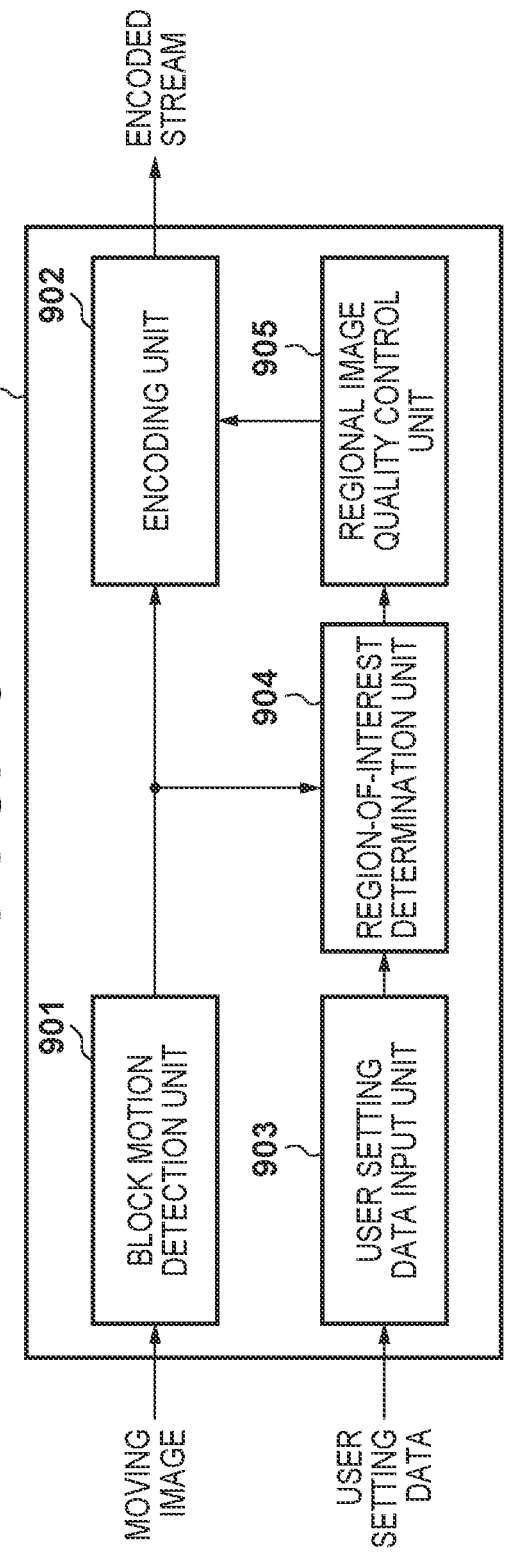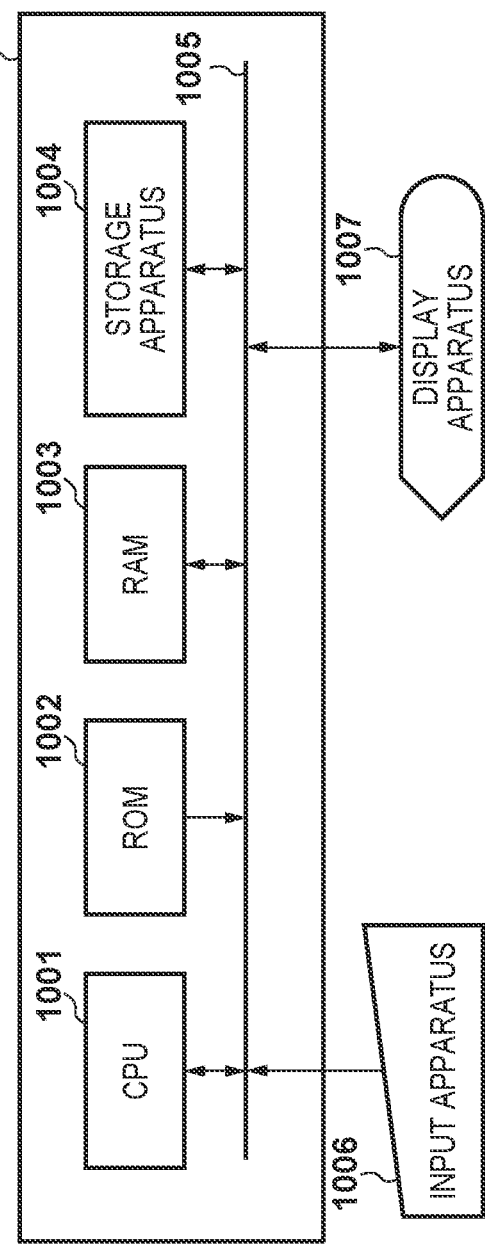

MOVING IMAGE ENCODING APPARATUS, CONTROL METHOD FOR MOVING IMAGE ENCODING APPARATUS, AND STORAGE MEDIUM

BACKGROUND OF THE INVENTION

Field of the Invention

The present invention relates to a moving image encoding apparatus, a control method for a moving image encoding apparatus, and a storage medium, and in particular relates to a technique for relatively improving image quality of a region of interest in a moving image and suppressing encoding amounts in other regions.

Description of the Related Art

A moving image signal encoding technique is used to perform transmission and storage/reproduction of a moving image. An international standardized encoding method such as the ISO/IEC International Standard 14496-2 (MPEG-4 Visual) is known as this kind of technique. Also, H.264, H.265, which is the standard succeeding H.264, and the like, which are published by ITU-T and ISO/IEC, are known as other international standard encoding methods. In the present specification, ITU-T Rec. H.264 Advanced Video Coding |ISO/IEC International Standard 14496-10 (MPEG-4 AVC) will be referred to simply as H.264. Also, H.265 (ISO/IEC 23008-2 HEVC) will be referred to simply as H.265. These techniques are also used in the fields of video cameras, recorders, and the like, and particularly, in recent years, they have been actively applied to video cameras for monitoring (hereinafter referred to as monitoring cameras). In a monitoring camera application, there are many cases in which the size of the encoded data is suppressed by encoding with a comparatively low bit rate due to the need to perform long-term recording. However, a lot of information is lost through encoding at a low bit rate and the image quality deteriorates, and therefore original functions, such as specifying a person's face or specifying a number plate of an automobile, are impaired in some cases. In view of this, a technique has commonly been used in which the entirety of a frame is not encoded, an important region such as a moving object or person is detected as a region of interest, and the frame is divided into a region of interest and a region of non-interest. Then, the region of non-interest is encoded such that the encoding amount is suppressed, and the region of interest is encoded such that the image quality does not decrease.

Japanese Patent Laid-Open No. 2004-187023 discloses that distinguishing of important portions is performed using coordinate information data obtained through region setting performed by a user, processing for recognizing a monitoring target, or the like, and correction is performed by moving the region based on the motion vector. Accordingly, it is possible to distinguish regions with high precision, and it is possible to record a moving image with high image quality and at a low bit rate.

However, with the technique disclosed in Japanese Patent Laid-Open No. 2004-187023, correction is performed on a region determined in advance as a region of interest, and therefore if a region of interest is included in the region determined as a region of non-interest, the region of interest cannot be recognized. For this reason, the region that is originally to be determined as a region of interest has a low image quality in some cases, which is problematic.

The present invention was made in view of the above-described problem and provides a technique for improving the accuracy of determining a region of interest and efficiently reducing the bit rate.

SUMMARY OF THE INVENTION

According to one aspect of the present invention, there is provided a moving image encoding apparatus, comprising: a detection unit configured to detect motion information in units of blocks from a moving image; a determination unit configured to determine a region of interest in the moving image based on a first region determined through processing for detecting an object from an image, and the motion information; a control unit configured to perform control such that a quantized value of a block determined as being the region of interest is set to a value lower than a quantized value of a block determined as not being the region of interest; and an encoding unit configured to perform compression encoding on the moving image based on the quantized value set by the control unit.

Further features of the present invention will become apparent from the following description of exemplary embodiments with reference to the attached drawings.

BRIEF DESCRIPTION OF THE DRAWINGS

FIG. 9 is a functional block diagram of a moving image encoding apparatus according to an embodiment of the present invention.

FIG. 10 is a diagram showing an example of a hardware configuration of the moving image encoding apparatus according to an embodiment of the present invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In the present embodiment, an example will be described in which a region of interest is determined from a moving image based on region setting data (first region) including information on a region of interest, and motion information. More specifically, an example will be described in which higher-accuracy determination of a region of interest is realized by correcting, based on motion vectors, information on a region of interest and/or a region of non-interest determined using the region setting data obtained based on motion detection processing. It should be noted that a region of interest is a region that is also referred to as an ROI (Region of Interest), and is a region that is to be given attention during monitoring or the like. For example, a region of interest is a region that corresponds to an object detected by a recognition unit or an object detection unit that performs image analysis. Also, any position may be designated as a region of interest by the user.

Apparatus Configuration

Figure 1:
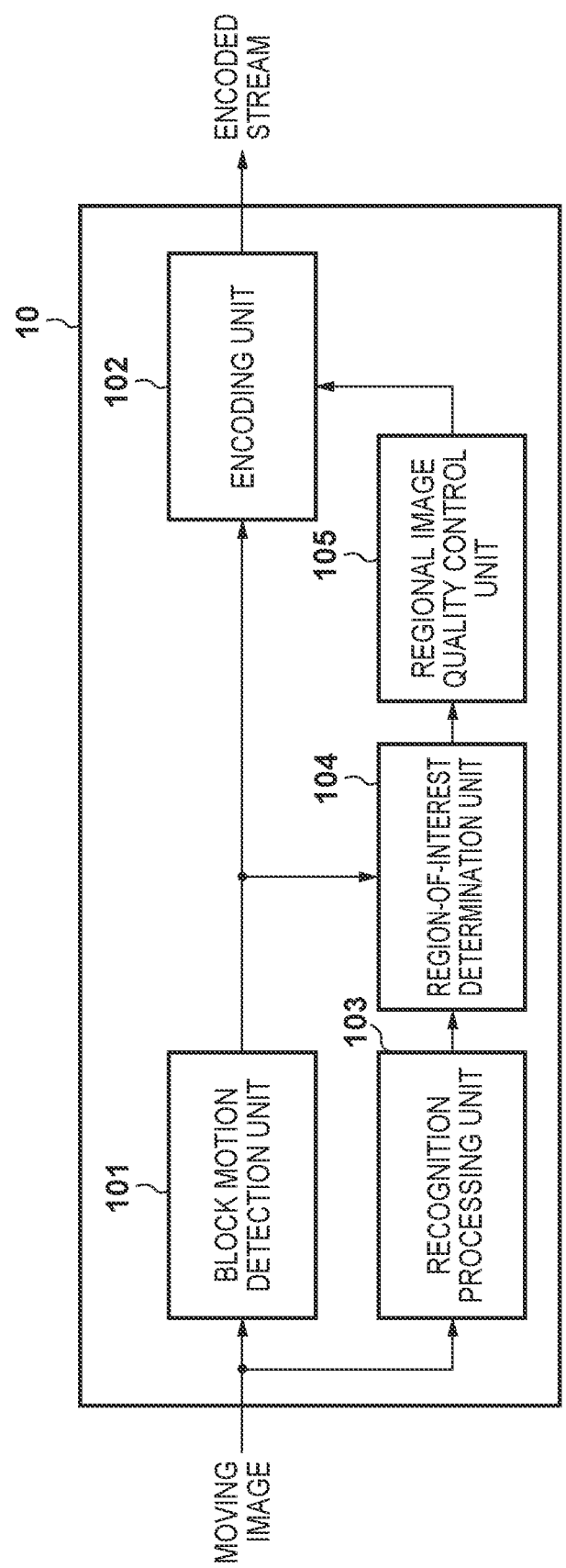
FIG. 1 is a functional block diagram of a moving image encoding apparatus according to an embodiment of the present invention.

FIG. 1 is a functional block diagram of a moving image encoding apparatus according to the present embodiment. The moving image encoding apparatus 10 compresses and encodes an input moving image (captured moving image) in units of frames and outputs an encoded stream in H.265 format. Note that in the present embodiment, the stream to be output is in H.265 format, but the present invention is not limited thereto. For example, it is also possible to use an encoded stream in H.264 format or MPEG-4 format. The moving image encoding apparatus 10 compresses and encodes the captured moving image to be encoded, in units of Coding Tree Units (hereinafter, CTUs) in the H.265 format. Note that in the present embodiment, the moving image is divided into units of CTUs, but the present invention is not limited to this, and for example, it is also possible to divide the moving image into units of macroblocks in H.264. Also, in the present embodiment, the size of a CTU is 64×64, but the present invention is not limited thereto, and it is also possible to use 32×32 or 16×16. Furthermore, the moving image encoding apparatus 10 sets image quality parameters (quantized values) for adjusting the image quality in units of CTUs, and thereby performs encoding such that the encoding amount is suppressed for a region of non-interest in the moving image, and performs encoding such that the image quality does not decrease in the region of interest. A quantized value is also referred to as a quantization parameter, and defines the quantization step. For example, the smaller a quantized value is, the smaller the quantization step is, and the higher the image quality is as a result.

The moving image encoding apparatus 10 includes: a block motion detection unit 101; an encoding unit 102; a recognition processing unit 103; a region-of-interest determination unit 104; and a regional image quality control unit 105. The block motion detection unit 101 divides CTUs into Prediction Units (hereinafter, PUs) in H.265 format in the input moving image, and calculates the motion vectors for each PU. The motion vectors calculated by the block motion detection unit 101 are output to the encoding unit 102 and the region-of-interest determination unit 104.

The encoding unit 102 performs motion compensation, quantization, and entropy encoding based on the motion vectors output from the block motion detection unit 101 and the quantized values output from the later-described region-of-interest determination unit 104, and outputs an H.265-format encoded stream.

The recognition processing unit 103 performs recognition processing for detecting the data of a monitoring target from the input moving image. In the present embodiment, the monitoring target is defined as a moving body, and moving body detection processing is performed. However, the present invention is not limited thereto. For example, it is also possible to use not only moving body detection, but also human body detection, face detection, moving body tracking, and processing for detecting another monitoring target, such as a number plate of a car or a specific object such as a luxury product. Also, the recognition processing may or may not be realized using an algorithm obtained based on pattern recognition. In either case, it is sufficient to use processing for detecting the object that is to be the region of interest by analyzing the image. It should be noted that in the case of detecting a moving body, for example, an inter-frame difference method or a background difference method is used. Also, in the case of detecting a person, for example, pattern matching is used. As described above, the recognition processing unit 103 need only have a function serving as an image analysis unit for analyzing an image, and generate information indicating a region corresponding to a detection target detected through image analysis.

Then, the recognition processing unit 103 generates region setting data (first region) including information indicating the coordinates at which a monitoring target is present in the moving image based on the data of the monitoring target that was detected (detection target), and indicating the position of the region of interest, which is the region corresponding to the monitoring target, and outputs the information to the region-of-interest determination unit 104.

For example, the region setting data may be obtained by expressing coordinate information that is limited to the upper left portion of the image and has axes in the vertical direction and the horizontal direction of the image, using numeric values, and may be obtained by visually mapping a region on a plane. In general, recognition processing often has a large load, and detection can only be performed at a frame rate lower than the imaging frame rate of the moving image, and thus a delay occurs. For this reason, the region setting data output by the recognition processing unit 103 indicates the position of the monitoring target at a time in the past with respect to the frame to be encoded, and omission of the region of interest occurs in some cases. In order words, there is a possibility that the position at which the monitoring target is actually present in the target frame and the position of the monitoring target indicated by the region setting data will be misaligned. Thus, a region that is considered not to be indicated by the region setting data regardless of the fact that the monitoring target actually exists in the target frame is called an "omission" of a region of interest. In order to deal with this, region setting data correction processing is performed by the later-described region-of-interest determination unit 104.

The region-of-interest determination unit 104 determines the region of interest in the captured moving image based on the region setting data generated by the recognition processing unit 103, and the motion vectors output from the block motion detection unit 101, and outputs the region-of-interest determination information. At this time, the information on the motion vectors is used to correct omission of a region of interest in the region setting data. In the present embodiment, if a CTU has been set as a region of interest by the region setting data, or if the size of a motion vector is not zero even if the CTU has not been set as a region of interest, the CTU is determined as a region of interest. Accordingly, a region that was originally to be determined as being a region of interest but was determined as a region of non-interest can once again be determined as a region of interest, and therefore the region-of-interest determination accuracy can be improved.

However, the present invention is not limited thereto, and a region that has been set using the region setting data and has been determined as being important based on the motion vectors may be determined as a region of interest. In this case, a region of interest obtained based on the processing of the recognition processing unit 103 does not become a region of interest in some cases. Also, in this case, erroneous detection of a region of interest set using the region setting data can be reduced.

Also, the units for performing setting of the region of interest may be smaller ranges instead of CTUs. Alternatively, if both a region of interest indicated by the region setting data and a region of interest set based on a motion vector are present in a CTU, the reliability of the recognition may also be acquired from the recognition processing unit 103 and the determination result to be given priority may be determined based on the reliability. The reliability of the recognition may be the similarity degree between the data of the monitoring target held in advance, and the data of the detected monitoring target. Various characteristic amounts, such as values obtained based on the luminance value of the region of the monitoring target, for example, can be used as the similarity degree.

If the regional image quality control unit 105 determines that a block to be encoded is a region of interest based on the region-of-interest determination information output from the region-of-interest determination unit 104, the quantized value of the block is set to a low value such that its image quality is higher than that of blocks determined as not being regions of interest. On the other hand, if the block to be encoded is determined as not being a region of interest, the quantized value of the block is set to a high value such that its image quality is lower than that of a block determined as being a region of interest.

Here, with reference to FIG. 10, an example of a hardware configuration of the moving image encoding apparatus according to the first embodiment will be described. The moving image encoding apparatus 10 includes a CPU 1001, a ROM 1002, a RAM 1003, a storage apparatus 1004, and a bus 1005, and is connected to an input apparatus 1006 and a display apparatus 1007.

The CPU 1001 controls various operations performed by the above-described functional blocks of the moving image encoding apparatus 10 according to the present embodiment. The control content is instructed using a later-described program in the ROM 1002 or the RAM 1003. Also, the CPU 1001 can cause multiple calculator programs to operate in parallel. The ROM 1002 stores the calculator programs, which store procedures for control performed by the CPU 1001, and data. The RAM 1003 stores the control program to be processed by the CPU 1001 and provides a work region for various types of data for when the CPU 1001 executes various types of control. The function of the program code stored in the storage medium such as the ROM 1002 or the RAM 1003 is realized by the CPU 1001 performing readout and execution, but the type of the storage medium does not matter.

The storage apparatus 1004 can store various types of data and the like. The storage apparatus 1004 includes: a storage medium such as a hard disk, a floppy disk, an optical disk, a magnetic disk, a magneto-optical disk, a magnetic tape, or a non-volatile memory card; and a drive for storing information by driving the storage medium. The stored calculator program and data are called to the RAM 1003 when needed, through an instruction from a keyboard, or an instruction from various types of calculator programs.

The bus 1005 is a data bus that is connected to the constituent elements, realizes communication between the constituent elements, and is for rapidly realizing information exchange. The input apparatus 1006 provides various input environments depending on the user. Considering that various input operation environments are provided, a keyboard, mouse, and the like are conceivable, but it is also possible to use a touch panel, a stylus pen, and the like. The display apparatus 1007 is constituted by an LED display or the like and displays the state of various input operations and calculation results corresponding thereto. Note that the configuration described above is an example and there is no limitation to the described configuration.

Processing

Figure 2:
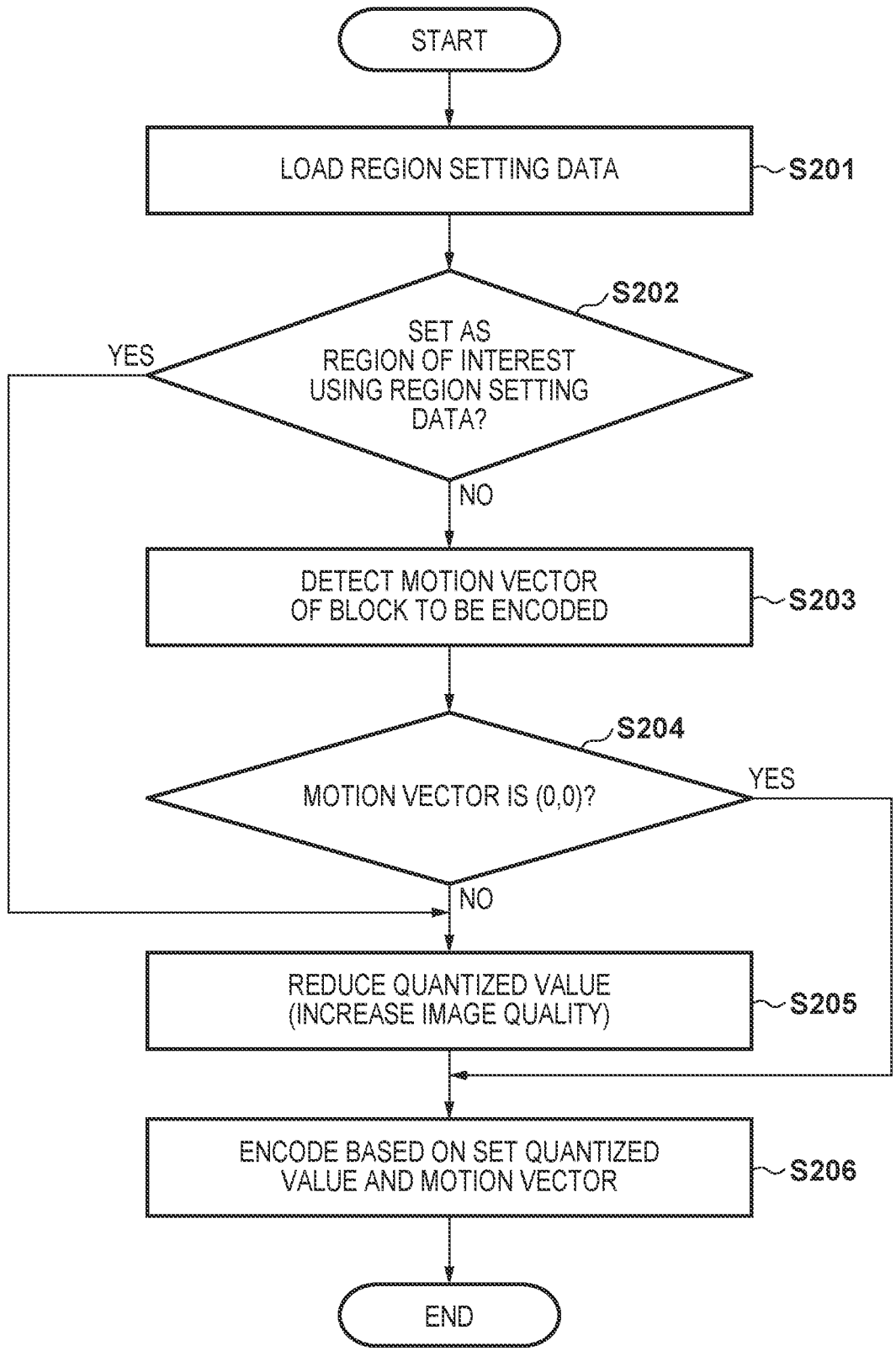
FIG. 2 is a flowchart showing a procedure of processing implemented by the moving image encoding apparatus according to an embodiment of the present invention.

Next, with reference to the flowchart in FIG. 2, a procedure of processing implemented by the moving image encoding apparatus according to the present embodiment will be described.

In step S201, the region-of-interest determination unit 104 loads the region setting data generated by the recognition processing unit 103.

In step S202, the region-of-interest determination unit 104 determines whether or not the CTU that is currently being encoded using the region set data has been set as the region of interest. If it has been set as the region of interest, the processing advances to step S205. On the other hand, if it has not been set as the region of interest, the processing advances to step S203.

In step S203, in the case of performing encoding using HEVC, the block motion detection unit 101 performs a motion search in units of CTUs, for example, and calculates the motion information (motion vectors) of the blocks to be encoded. It should be noted that the units for detecting the motion vectors need only be detected in any image block units, but if detection is performed in processing units for the encoding processing, the detection results for the encoding processing can be used, and therefore the processing load can be reduced.

In step S204, the region-of-interest determination unit 104 determines the important region in the captured moving image based on the motion information (motion vectors) output from the block motion detection unit 101. That is, even if a block that is an encoding target in the moving image has not been set as a region of interest using the region setting data, the region-of-interest determination unit 104 determines whether or not the block is to be changed into a region of interest based on the motion information (motion vectors).

In this manner, due to the processing of steps S202 to S204, the region-of-interest determination unit 104 determines the region of interest from the moving image based on the region setting data including the information on the region of interest, and the motion information (motion vectors).

More specifically, in step S204, if the size of the motion vector was not zero, the region-of-interest determination unit 104 determines that the block being encoded is to be changed into a region of interest, and the processing advances to step S205. On the other hand, if the size of the motion vector is zero, the block to be encoded is determined as a region of non-interest, and the processing advances to step S206.

However, the present invention is not limited thereto. For example, if the size of the motion vector exceeds a threshold set in advance, the block may be determined as a region of interest.

Also, the threshold may be set adaptively according to the distance to the CTU determined as the region of interest using the region setting data. A region with a portion near the region determined as a region of interest using the region setting data has a high likelihood of being a region that is a region of interest. In view of this, for example, a threshold of an adjacent block adjacent to the region determined as a region of interest using the region setting data may be set to a value that is lower than a threshold of a block further adjacent to the adjacent block.

Here, the size of the block for determining the region of interest will be mentioned. In H.265, pixels can be controlled (quantized values can be changed) in units of Coding Units (hereinafter, CUs). However, the smallest block that can be set using the region setting data obtained through recognition processing or the like does not necessarily have the same size as a CU. For example, it is assumed that only one 16×16 block corresponding to a quarter of a 32×32 CU has been set as a region of interest using the region setting data. At this time, the CU needs to be determined as either a region of interest or a region of non-interest. In the present embodiment, if even one block determined as a region of interest is present in the CU, the CU is determined as a region of interest.

However, the present invention is not limited to this, and for example, if even one block determined as a region of non-interest is present in the CU, the CU may be determined as a region of non-interest. Also, if both a region of interest and a region of non-interest are present, the percentages of the region of interest and the region of non-interest in the CU are calculated, and it is possible to determine whether or not the CU is a region of interest based on the percentages. More specifically, the region with the greater percentage may be given priority. For example, if three 32×32 regions of interest are present in a 64×64 CU, the CU may be determined as a region of interest. Alternatively, if both a region of interest and a region of non-interest are present, the reliability of the recognition may be acquired from the recognition processing unit 103, and if the reliability is high based on the information of the reliability, the CU may be determined as a region of interest. As a result of this kind of processing, if the entire 32×32 surface is determined as a region of interest, the number of regions of interest will increase and the bit rate will increase, but it is possible to suppress non-detection of a monitoring target. On the other hand, if the entire 32×32 surface is determined as a region of non-interest, it is possible to realize reduction of a higher bit rate while allowing some non-detection of a monitoring target.

In step S205, the regional image quality control unit 105 sets the quantized value to a low value such that the image quality of the region of interest is higher than that of the region of non-interest. Conversely, the regional image quality control unit 105 may also set the quantized values of CTUs that were not determined as regions of interest to a higher value. Also, for a block for which both the region setting data and the motion vector indicate values indicating that the block is to be determined as a region of interest, the quantized value of the block may be set to a value lower than the quantized value of a block for which one of the region setting data and the motion vector indicates that the block is a region of interest. Alternatively, if both a region of interest and a region of non-interest are present, the percentages of the region of interest and the region of non-interest in the CU are calculated, and based on these percentages, the quantized value may be set. If a region of interest and a region of non-interest are both present in a CU, there is a high likelihood of being a contour of the object, but according to this, it is possible to suppress visual discomfort caused by rapid deterioration of the image quality at the contour.

In step S206, the encoding unit 102 performs motion compensation, quantization, and entropy encoding based on the motion vectors output from the block motion detection unit 101 and the quantized values output from the regional image quality control unit 105. Then, an H.265-format encoded stream is output. It should be noted that if the size of the motion vector is 0 (S204; Yes), the block to be encoded is determined as a region of non-interest, and therefore the predetermined quantized value is output to the encoding unit 102 from the regional image quality control unit 105 without changing the quantized value. With that, the series of processes shown in FIG. 2 ends.

Motion Detection Processing

Figure 3:
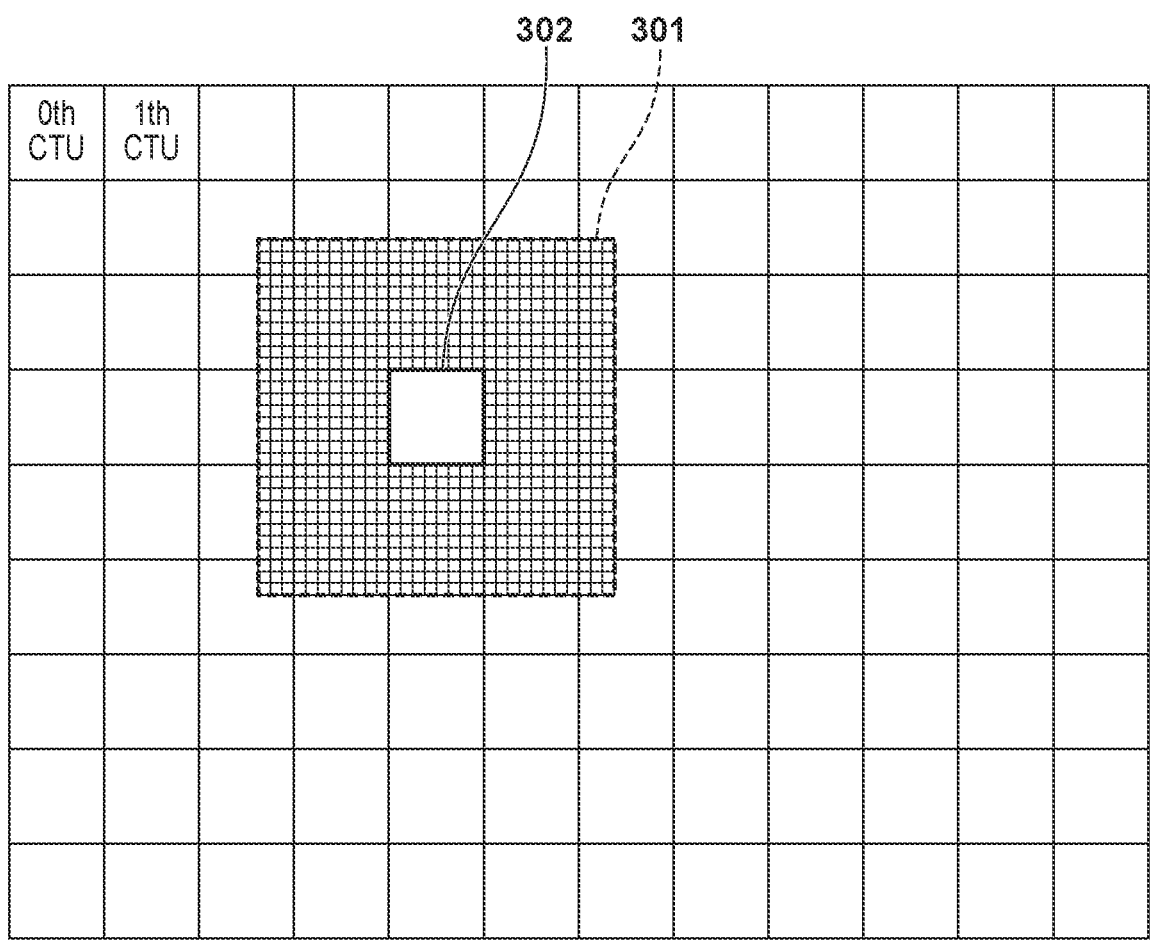
FIG. 3 is a diagram showing an example of a range for performing block motion detection, according to an embodiment of the present invention.
Figure 4:
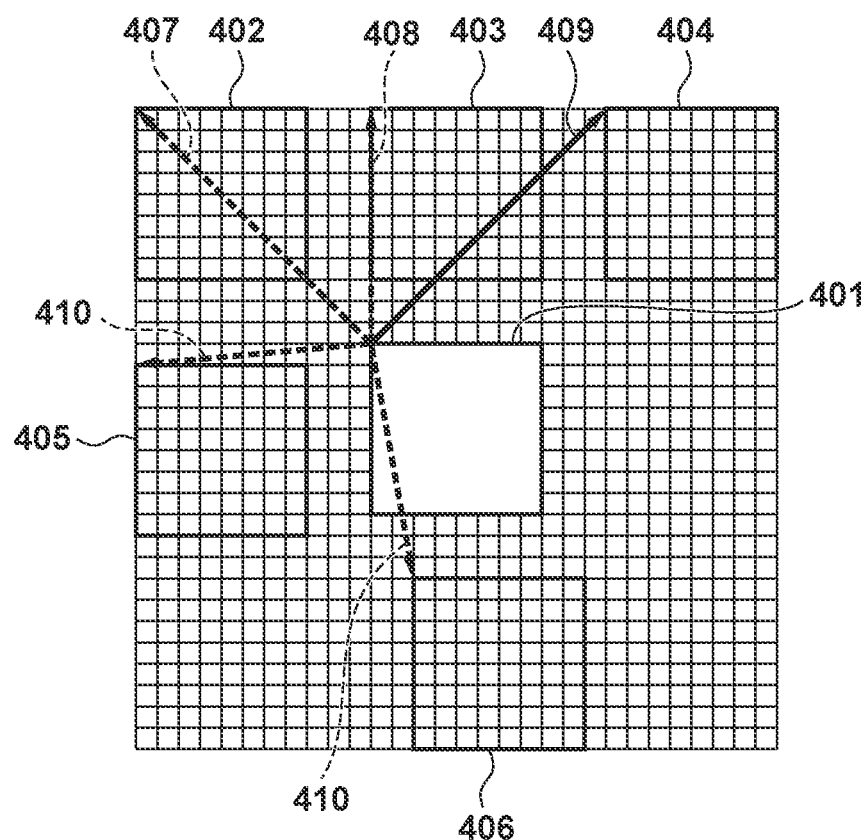
FIG. 4 is a diagram showing an example of a block motion detection method and output motion vectors, according to an embodiment of the present invention.

Next, processing for block motion detection according to the present embodiment will be described in detail. FIG. 3 shows a frame of a moving image, and a range 301 surrounded by a dotted line is a range of performing block motion detection. A block similar to the current CTU 302 is searched for in the range. It should be noted that in the present embodiment, searching is performed using the CTU size, but the present invention is not limited thereto. For example, the size of a block may also be changed according to the resolution of the frame and the spatial frequency of the pixels. At this time, as shown in FIG. 4, the pixel values are sequentially compared while moving the CTU 401 in the range of performing block motion detection, and the sum of absolute differences (SAD), which means the sum of differences of absolute values, is calculated for each block size that is the same as that of the CTU. The SAD is defined using the following equation.

Equation 1

$$SAD = \sum_{x,y} |Diff(x, y)| \quad (1)$$

Diff(x,y) indicates the difference between the pixel values at the coordinates (x,y) of pixels in the moving image. In the drawing, motion vectors 407 to 410 corresponding to the blocks 402 to 406, for example, are determined. If the position of the block at which the SAD is at a minimum is specified as being the block 404, the block 404 is set as a similar block. Then, the information on the relationship between the coordinates of the current CTU and the similar block is the motion vector 409 (first motion vector) output by the block motion detection unit 101.

Here, the reason why correction using the motion vectors is effective for correcting the region setting data generated through region detection will be described.

Figure 5:
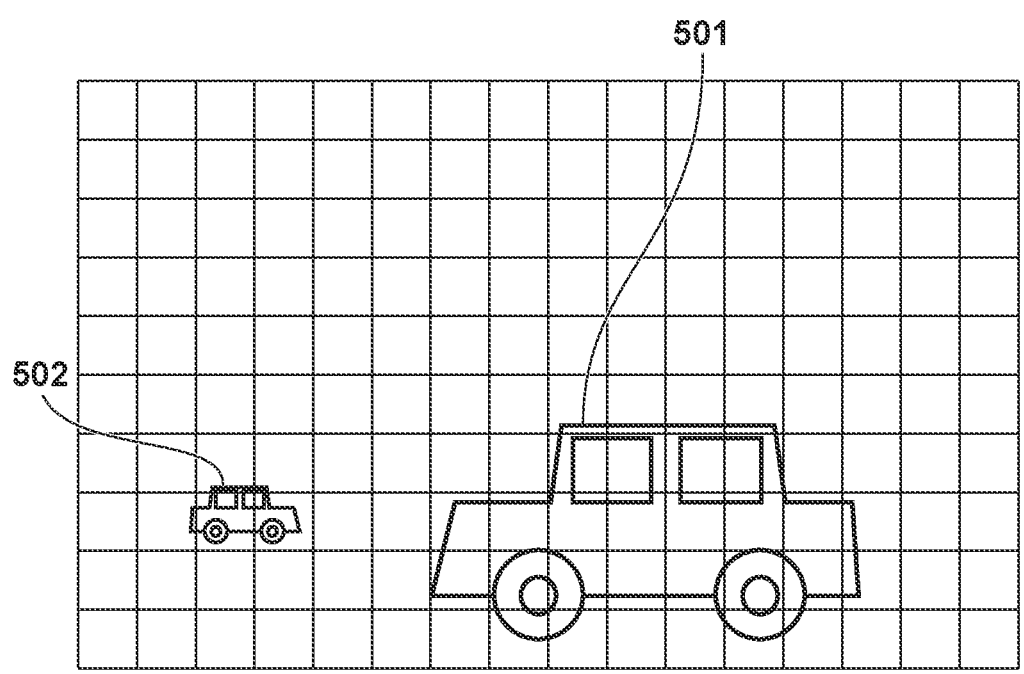
FIG. 5 is a diagram showing an example of an input moving image according to an embodiment of the present invention.
Figure 6:
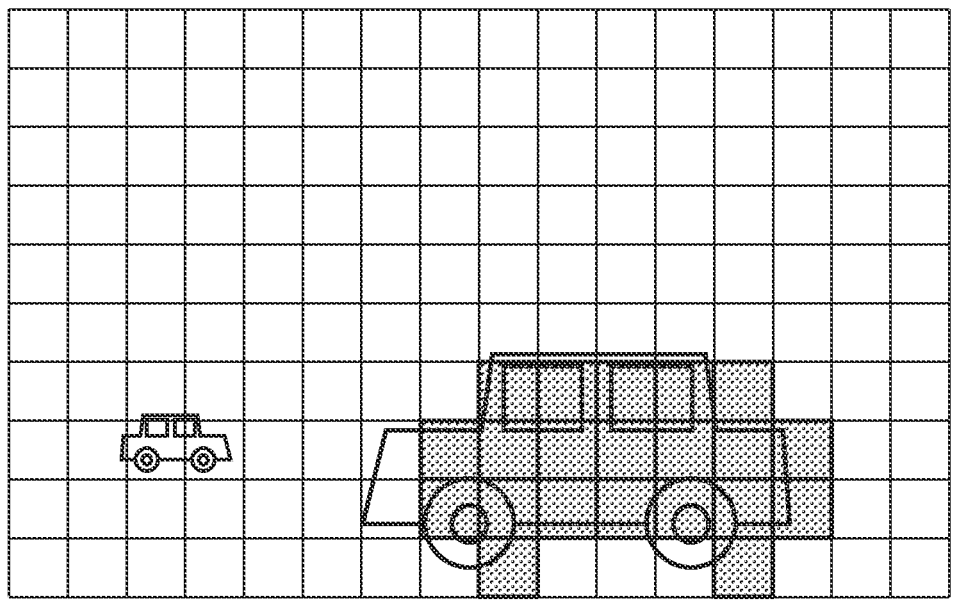
FIG. 6 is a diagram showing an example of a region of interest set by a recognition processing unit according to an embodiment of the present invention.

FIG. 5 shows a frame of a moving image that is to be subjected to compression encoding. An automobile 501 located on the right moves from the right to the left. The automobile 502 located on the left is located on the far side with respect to the car located on the right, and moves from the left to the right. Also, FIG. 6 shows an example of a frame in which a region of interest is determined based on the region setting data. Regarding the moving body detection processing, real-time processing is difficult, depending on the scale of the system, and it is envisioned that a delay of several frames will occur, and the end portion in the proceeding direction will protrude from the region. Also, it is envisioned that the object that is located on the far side in the frame and appears small will not be detected.

Figure 7:
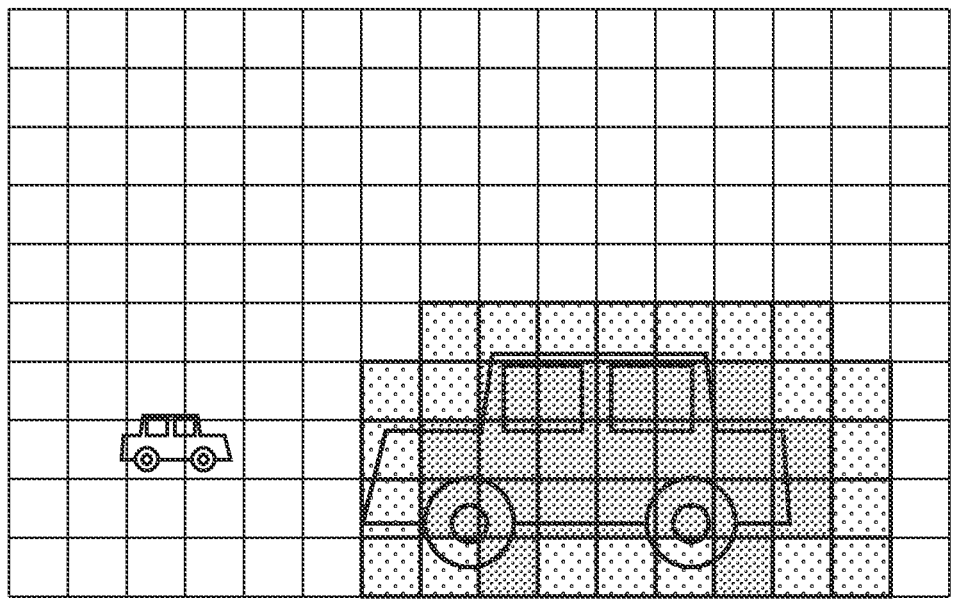
FIG. 7 is a diagram showing an example of correction processing in which an outline of a region of interest set by the recognition processing unit is enlarged, according to an embodiment of the present invention.

In order to deal with this, as shown in FIG. 7, it is thought that correction of the results of determining the region of interest is performed by enlarging the region. However, by merely enlarging the region, there is a possibility that an unimportant region in which no moving body exists will be determined as a region of interest, causing an increase in the bit rate as a result. Furthermore, there is a possibility that the automobile on the far side, which was not detected in the moving body detection processing, cannot be determined as a region of interest.

Figure 8:
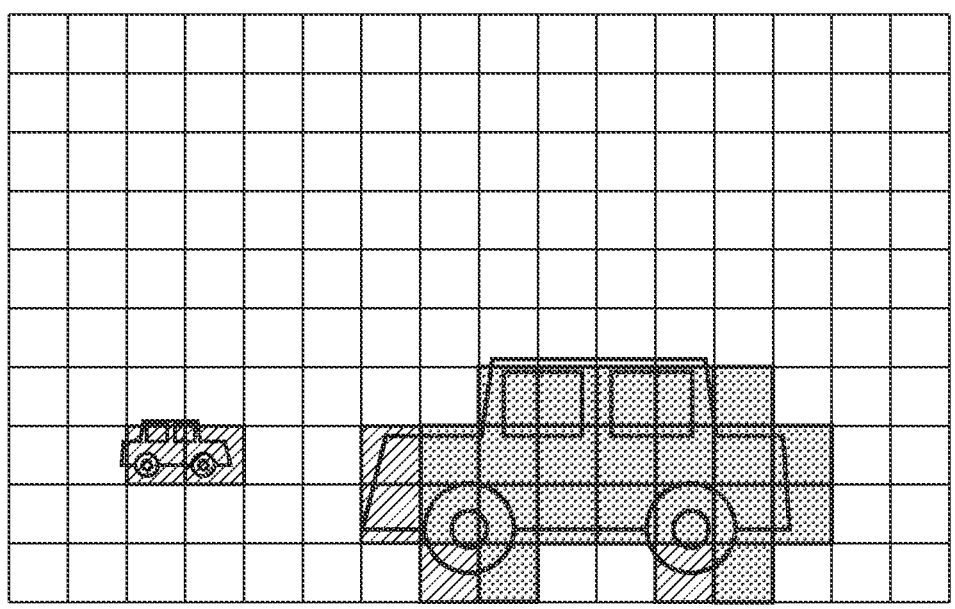
FIG. 8 is a diagram showing an example in which a region of interest set by a recognition processing unit is corrected based on a motion vector, according to an embodiment of the present invention.

In view of this, as shown in FIG. 8, the region of interest is corrected based on the motion vector. Accordingly, the region that was not determined as a region of interest based on the region setting data, such as the end portion of the automobile in the proceeding direction of the small automobile located on the far side, can be determined as a region of interest.

Also, no motion vector occurs in the end portion of a moving body or an object with a low spatial frequency of pixels, such as an object with no pattern. For this reason, if the regions of interest have been determined using only motion vectors, the regions will be determined as regions of non-interest. In view of this, the regions of interest can be determined with high accuracy by using both the region setting data output from the recognition processing unit 103 and the motion vectors.

As described above, in the present embodiment, an example will be described in which a region of interest is determined from a moving image based on region setting data including information on a region of interest, and motion information. More specifically, information on a region of interest and/or a region of non-interest set using the region setting data obtained based on the moving body detection processing is corrected based on a motion vector. As a result, the region that is to be the region of interest in the capture moving image to be encoded can be appropriately set to a high image quality.

Second Embodiment

In the first embodiment, an example was described in which a region of non-interest set using the region setting data obtained based on moving body detection processing is corrected based on a motion vector. In contrast to this, in the present embodiment, an example will be described in which information on a region of non-interest set by a user is corrected based on a motion vector.

Apparatus Configuration

FIG. 9 is a functional block diagram of a moving image encoding apparatus according to the present embodiment. The moving image encoding apparatus 90 according to the present embodiment includes: a block motion detection unit 901; an encoding unit 902; a user setting data input unit 903; a region-of-interest determination unit 904; and a regional image quality control unit 905. Since the corresponding configurations of the first embodiment are the same for the block motion detection unit 901, the encoding unit 902, the region-of-interest determination unit 904, and the regional image quality control unit 905, detailed description thereof is omitted. The user setting data input unit 903 receives input of user setting data including information obtained by the user setting coordinates that are to have a higher image quality (information on a region of interest set by the user (first region)). The user setting data is assumed to be set in advance by a user operating the input apparatus 1006, for example. In a moving image with a fixed viewpoint, such as a monitoring image, it is envisioned that a human body, an automobile, a specific building, a valuable item, or the like is set as a region of interest, and a region that does not change for a long time, such as trees, the sky, sea, or an unimportant background, is set as a region of non-interest.

Processing

Next, a procedure of processing implemented by a moving image encoding apparatus according to the present embodiment will be described with reference to the flowchart in FIG. 2, which was described in the first embodiment.

In step S201, the user setting data input unit 903 loads the user setting data as the region setting data. In the user setting data, regions of interest and regions of non-interest are expressed as coordinate information in frames of the moving image.

In step S202, the region-of-interest determination unit 104 determines whether or not the CTU that is currently being encoded using the user setting data has been set as the region of interest. The processing thereafter is similar to the processing described in the first embodiment, and correction of whether or not a region not set as a region of interest using the user setting data is a region of interest is performed based on a motion vector.

As described above, in the present embodiment, information on a region of non-interest set by a user is corrected based on a motion vector. As a result, the region that is to be the region of interest in the capture moving image to be encoded can be appropriately set to a high image quality.

According to the present invention, it is possible to improve the accuracy of determining the region of interest and to efficiently reduce the bit rate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-033677, filed Feb. 27, 2018, which is hereby incorporated by reference wherein in its entirety.

What is claimed is:

1. A moving image encoding apparatus comprising:
    a computer; and
    a memory for storing instructions to be executed by the computer, wherein, when the instructions stored in the memory are executed by the computer, the moving image encoding apparatus functions as:
        a detection unit configured to detect a motion vector in units of blocks from a moving image;
        a determination unit configured to determine a region of interest in the moving image based on a size of the motion vector and an object region determined through processing for detecting an object from the moving image;
        a control unit configured to perform control such that a quantization parameter of a block determined as being the region of interest is set to a value lower than a quantization parameter of a block determined as not being the region of interest; and
        an encoding unit configured to perform encoding on the moving image based on the quantization parameter set by the control unit,
    wherein the control unit is configured to perform control such that a quantization parameter of a block determined as being the region of interest based on both of the size of the motion vector and the object region is set to a value lower than a quantization parameter of a block determined as being the region of interest based on one of the size of the motion vector and the object region.

2. The moving image encoding apparatus according to claim 1, wherein if a given block is not the object region, the determination unit determines whether or not the given block is to be changed into the region of interest based on the size of the motion vector detected for the encoding on the given block.

3. The moving image encoding apparatus according to claim 1, wherein if both the region of interest and a region of non-interest are present in the block, the determination unit determines whether or not the block is the region of interest based on percentages of the region of interest and the region of non-interest in the block.

4. The moving image encoding apparatus according to claim 3, wherein if both the region of interest and a region of non-interest are present in the block, the control unit sets a quantization parameter of the block based on percentages of the region of interest and the region of non-interest in the block.

5. The moving image encoding apparatus according to claim 1, wherein if both the region of interest and a region of non-interest are present in the block, the determination unit determines whether or not the block is the region of interest based on reliability that the object region is the region of interest.

6. The moving image encoding apparatus according to claim 1, wherein if the size of the motion vector exceeds a threshold, the determination unit determines that the block is the region of interest.

7. The moving image encoding apparatus according to claim 6, wherein a threshold of an adjacent block adjacent to the object region is a value that is lower than a threshold of a block further adjacent to the adjacent block.

8. The moving image encoding apparatus according to claim 1, wherein, when the instructions stored in the memory are executed by the computer, the moving image encoding apparatus further functions as a detection unit configured to detect the object from the moving image.

9. A control method for a moving image encoding apparatus, the method comprising:
    detecting a motion vector in units of blocks from a moving image;
    determining a region of interest in the moving image based on a size of the motion vector and an object region determined through processing for detecting an object from the moving image;
    performing control such that a quantization parameter of a block determined as being the region of interest is set to a value lower than a quantization parameter of a block determined as not being the region of interest; and
    performing encoding on the moving image based on the set quantization parameter,
    wherein, in performing the control, it is further controlled such that a quantization parameter of a block determined as being the region of interest based on both of the size of the motion vector and the object region is set to a value lower than a quantization parameter of a block determined as being the region of interest based on one of the size of the motion vector and the object region.

10. A non-transitory computer-readable storage medium storing a computer program for causing a computer to execute a control method for a moving image encoding apparatus, the method comprising:
    detecting a motion vector in units of blocks from a moving image;
    determining a region of interest in the moving image based on a size of the motion vector and an object region determined through processing for detecting an object from the moving image;
    performing control such that a quantization parameter of a block determined as being the region of interest is set to a value lower than a quantization parameter of a block determined as not being the region of interest; and
    performing encoding on the moving image based on the set quantization parameter,
    wherein, in performing the control, it is further controlled such that a quantization parameter of a block determined as being the region of interest based on both of the size of the motion vector and the object region is set to a value lower than a quantization parameter of a block determined as being the region of interest based on one of the size of the motion vector and the object region.

11. The moving image encoding apparatus according to claim 1, wherein the determination unit is configured to determine whether a given block is to be included in the region of interest, at least based on whether a size of the motion vector detected for the encoding on the give block is not zero.

\* \* \* \* \*